US012656504B2

(12) United States Patent
Clare et al.

(10) Patent No.: US 12,656,504 B2
(45) Date of Patent: Jun. 16, 2026

(54) MULTIPATH MITIGATION FOR GNSS LOCATION DETERMINATION USING DUAL ANTENNAS

(71) Applicant: Trimble Inc., Westminster, CO (US)

(72) Inventors: Adam Clare, Westminster, CO (US);
Shawn Weisenburger, Westminster,
CO (US); Greg Wallace, San
Francisco, CA (US)

(73) Assignee: Trimble Inc., Westminster, CO (US)

( * ) Notice: Subject to any disclaimer, the term of this
patent is extended or adjusted under 35
U.S.C. 154(b) by 513 days.

(21) Appl. No.: 18/091,675

(22) Filed: Dec. 30, 2022

(65) Prior Publication Data

US 2024/0219581 A1    Jul. 4, 2024

(51) Int. Cl.
G01S 19/22        (2010.01)
G01S 19/32        (2010.01)
G01S 19/43        (2010.01)

(52) U.S. Cl.
CPC .............. G01S 19/22 (2013.01); G01S 19/32
(2013.01); G01S 19/43 (2013.01)

(58) Field of Classification Search
CPC ........... G01S 19/22; G01S 19/32; G01S 19/43
See application file for complete search history.

(56) References Cited

U.S. PATENT DOCUMENTS 7,310,062 B1    12/2007  Hwang
2011/0090114 A1*  4/2011  Fenton ................... G01S 19/54
                                                        702/150

(Continued)

FOREIGN PATENT DOCUMENTS

CN        102998689 B    9/2016
CN        106443746 A    2/2017

(Continued)

OTHER PUBLICATIONS

B.W. Parkinson et al., Global Positioning System: Theory and
Applications, vol. I; Progress in Astronautics and Aeronautics, vol.
163, American Institute of Aeronautics and Astronautics, Inc., p.
10-11, 1996 (Year: 1996).*

(Continued)

*Primary Examiner* — Robert W Hodge
*Assistant Examiner* — Fred H Mull
(74) *Attorney, Agent, or Firm* — Kilpatrick Townsend &
Stockton LLP

(57)            ABSTRACT

A device for determining coordinates of a location can
include two GNSS receiver antennas positioned in fixed
relation to each other and separated by a short baseline.
Signals received from the two receiver antennas can be
processed to estimate a degree to a multipath effect may be
impairing reliability of observables extracted from the
received signals. Where both antennas observe signals at the
same carrier frequency from the same satellite, each antenna
can determine a carrier phase, and a single-difference carrier
phase (SDCP) can be computed and used to estimate mul-
tipath effects. Where both antennas observe signals at two
(or more) carrier frequencies from the same satellite, a
"geometry-free" SDCP can be computed and used to esti-
mate multipath effects. Observations of different satellites
can be weighted based on the estimated multipath effects.

9 Claims, 12 Drawing Sheets
(2 of 12 Drawing Sheet(s) Filed in Color)

(56)                References Cited

U.S. PATENT DOCUMENTS

| | | | | |
|---|---|---|---|---|
| 2011/0267227 | A1* | 11/2011 | Dai | G01S 19/54 |
| | | | | 342/357.27 |
| 2017/0350988 | A1 | 12/2017 | Nakamura et al. | |
| 2018/0284287 | A1 | 10/2018 | Kim et al. | |
| 2020/0132862 | A1 | 4/2020 | Toda et al. | |
| 2021/0132236 | A1* | 5/2021 | Cookman | G01S 19/24 |
| 2021/0333413 | A1* | 10/2021 | Zyryanov | G01S 19/22 |
| 2021/0333415 | A1 | 10/2021 | Morton et al. | |
| 2024/0219576 | A1 | 7/2024 | Clare et al. | |

FOREIGN PATENT DOCUMENTS

| | | | | | |
|---|---|---|---|---|---|
| CN | 110850400 | A | | 2/2020 | |
| CN | 111580136 | A | * | 8/2020 | G01S 19/20 |
| CN | 113 805 209 | A | | 12/2021 | |
| CN | 115308682 | A | | 11/2022 | |
| CN | 116540285 | A | | 8/2023 | |
| FR | 2823309 | A1 | * | 10/2002 | G01S 19/36 |
| WO | 2020/041383 | A1 | | 2/2020 | |

OTHER PUBLICATIONS

J.S. Subirana et al., Combination of GNSS Measurements, https://gssc.esa.int/navipedia/index.php?title=Combination_of_GNSS_Measurements, 2 pages (Year: 2011).*

N. Sunderhauf, Robust Optimization for Simultaneous Localization and Mapping, Dissertation, Fakultat fur Elektrotechnik und Informationstechnik Technische Universitat Chemnitz, 231 pages (Year: 2012).*

S. Liu et al., A Dual Frequency Carrier Phase Error Difference Checking Algorithm for the GNSS Compass, Sensors, 21 pages (Year: 2016).*

N.A. Tmazirte et al., Towards a new GNSS observation weighting strategy for terrestrial applications, The European Navigation Conference, 10 pages (Year: 2020).*

M. Saeed, A Gentle Introduction to Sigmoid Function, https://machinelearningmastery.com/a-gentle-introduction-to-sigmoid-function , 10 pages (Year: 2021).*

U.S. Appl. No. 18/091,674, Notice of Allowance, Mailed on Feb. 27, 2025, 8 pages.

Extended European Search Report for Application No. 23217764.2-1206, mailed Jun. 10, 2024, 21 pages.

Extended European Search Report for Application No. 23217758.4-1206, mailed May 29, 2024, 11 pages.

Moradi, R. et al., "Reducing GPS Wide Lane Ambiguity Resolution Time: A Novel Carrier Phase Multipath Mitigation Technique", ITM 2013—Proceedings of the 2013 International Technical Meeting of the Institute of Navigation, San Diego, CA, Jan. 27, 2013, pp. 343-350.

* cited by examiner

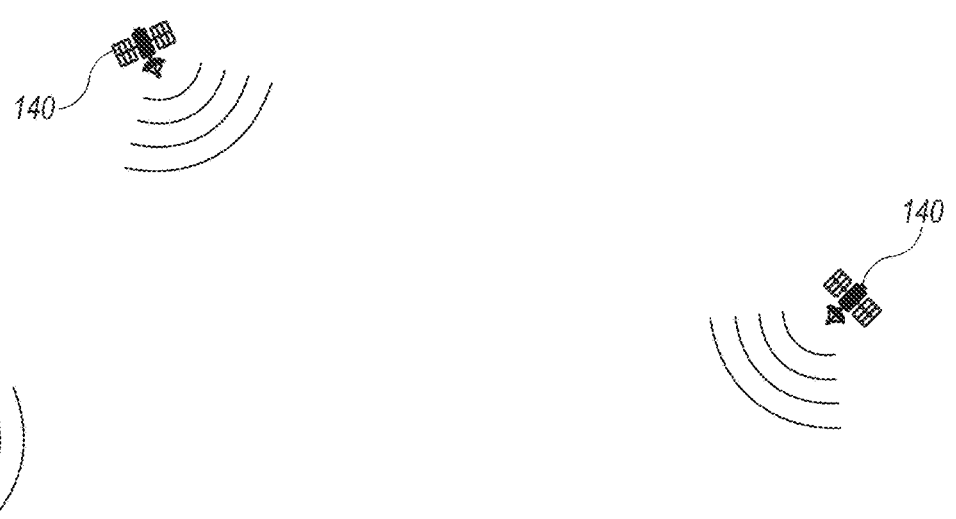
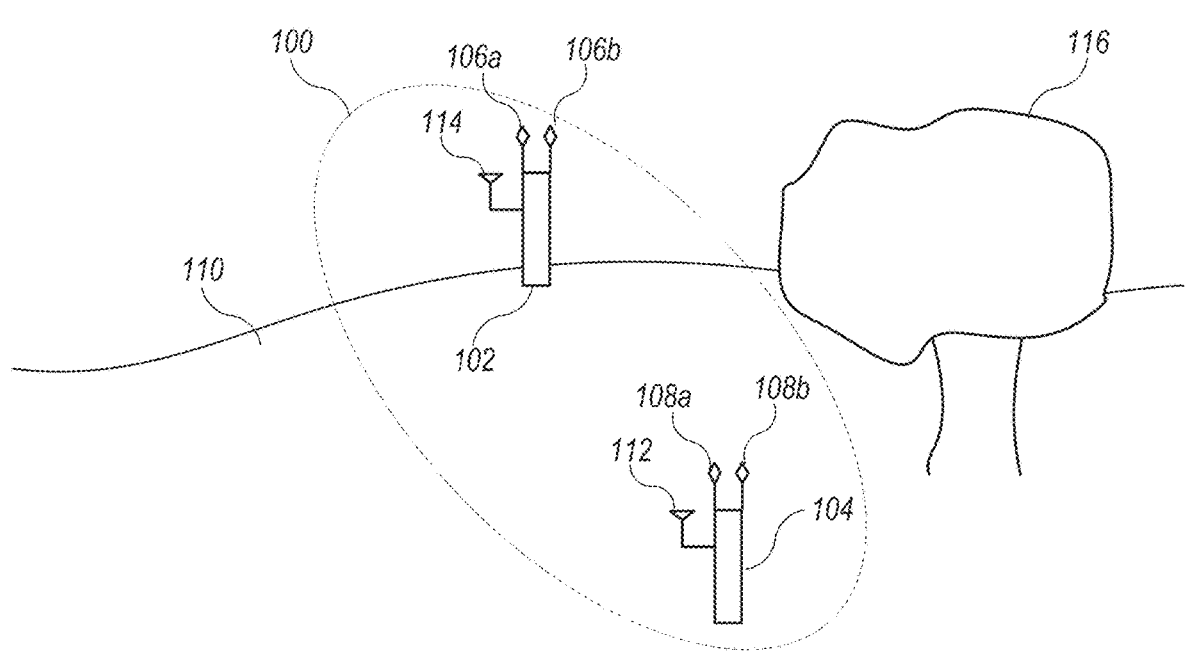
FIG. 1

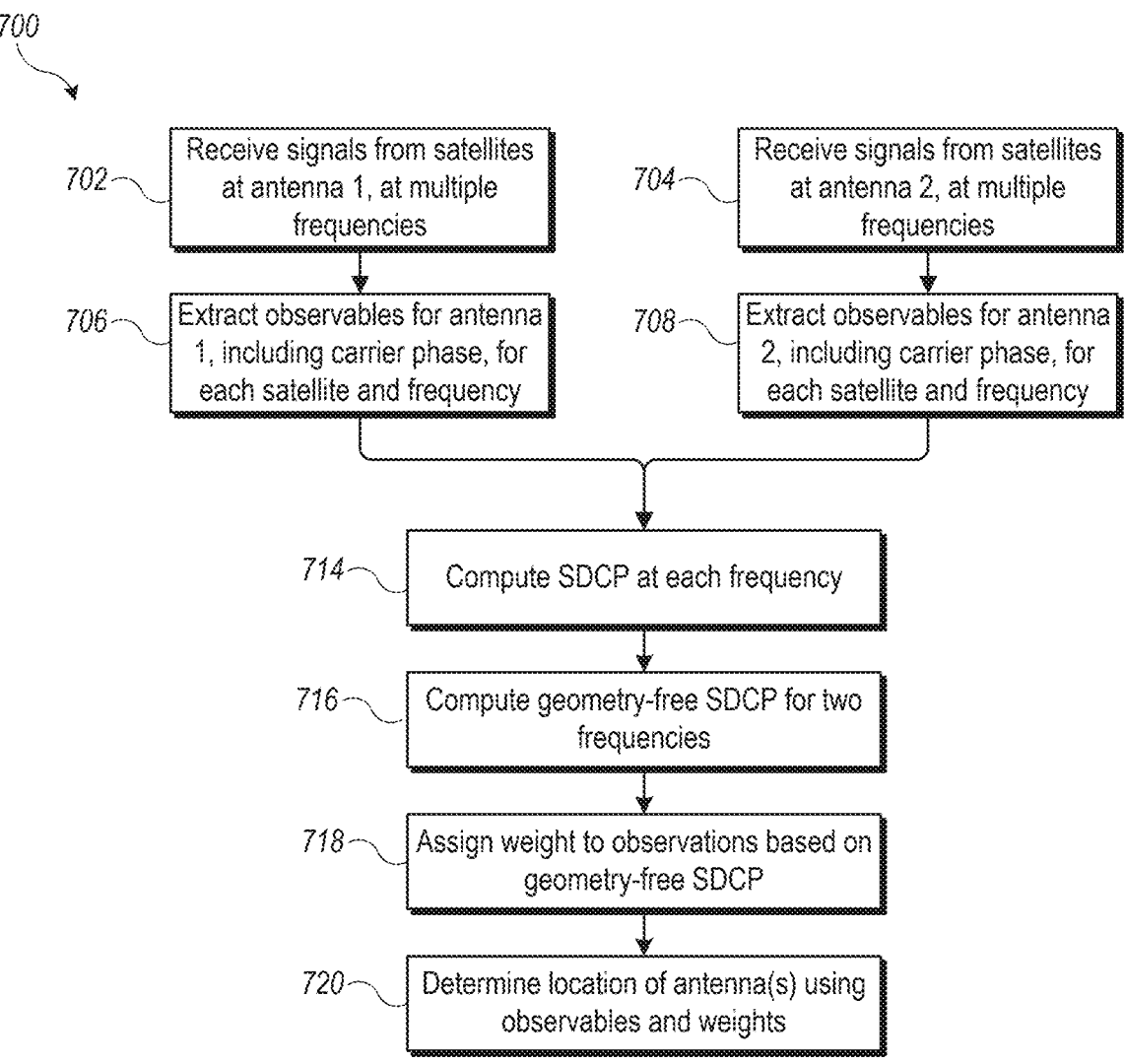

700

702 — Receive signals from satellites at antenna 1, at multiple frequencies

704 — Receive signals from satellites at antenna 2, at multiple frequencies

706 — Extract observables for antenna 1, including carrier phase, for each satellite and frequency 708 — Extract observables for antenna 2, including carrier phase, for each satellite and frequency 714 — Compute SDCP at each frequency 716 — Compute geometry-free SDCP for two frequencies 718 — Assign weight to observations based on geometry-free SDCP 720 — Determine location of antenna(s) using observables and weights

FIG. 7

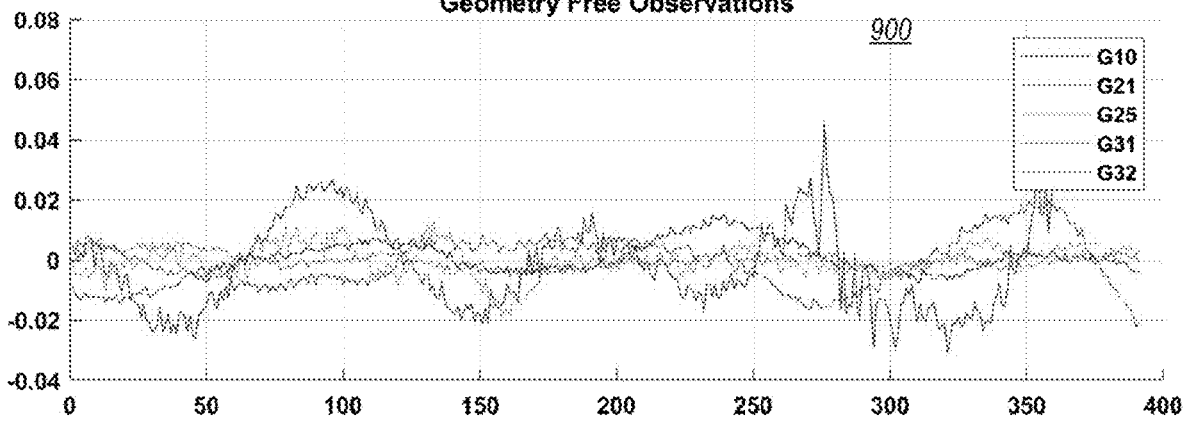
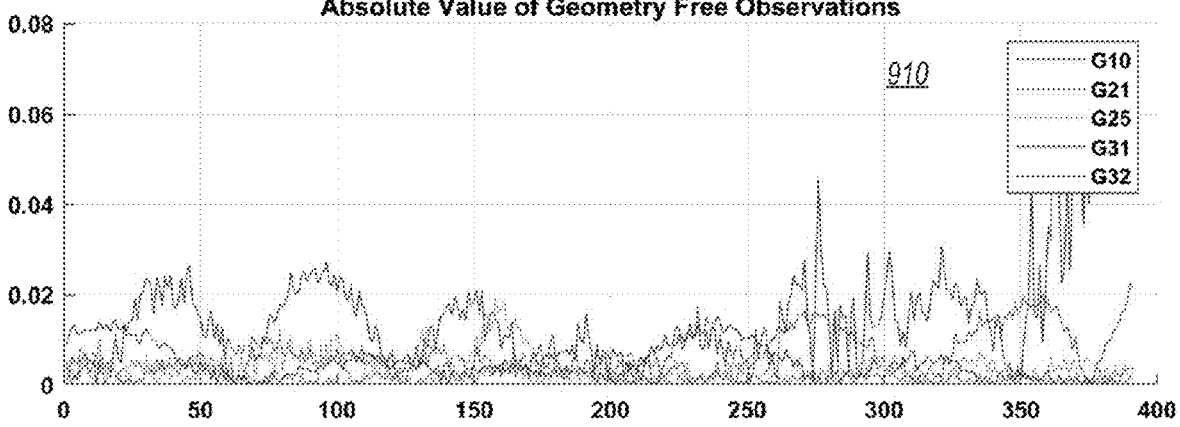
FIG. 9

MULTIPATH MITIGATION FOR GNSS LOCATION DETERMINATION USING DUAL ANTENNAS

CROSS-REFERENCES TO RELATED APPLICATIONS

The present disclosure is related to U.S. patent application Ser. No. 18/091,674, filed of even date herewith, the disclosure of which is incorporated herein by reference.

TECHNICAL FIELD

The present disclosure relates generally to location determination using a global navigation satellite system (GNSS) and in particular to multipath mitigation for GNSS location determination using dual receiver antennas.

BACKGROUND

Global navigation satellite systems (GNSS) include various constellations of satellites orbiting the earth. Examples include the Global Positioning System (GPS) (operated by the United States), GLONASS (operated by Russia), Galileo (operated by the European Space Agency), and BeiDou (operated by China). Each satellite emits signals that include satellite identifiers, ephemeris data (indicative of the location and health of the satellite), and timestamps. A GNSS receiver unit can receive signals from multiple satellites in one or more constellations and use the timestamps to determine the propagation delay time from the satellite to the receiver. Given signals from at least three or four satellites (depending on the particular receiver design), a location (typically expressed as a set of coordinates that can include a latitude, a longitude, and/or an altitude), can be triangulated. Signals from more than a minimum number of satellites can be used to improve accuracy of the location.

Location determination using GNSS is subject to various sources of error, including variable delays in the ionosphere and/or troposphere, clock synchronization errors, ephemeris errors, and multipath errors (where the signal may not take a direct path to the receiver). Accuracy of location determination using GNSS triangulation techniques is often limited to a few meters under open sky conditions and becomes worse under limited-view conditions.

Various techniques have been developed to improve accuracy of GNSS location determination. For example, real-time kinematic positioning (RTK) is commonly used in surveying and certain other applications where improved accuracy is desired. RTK uses phase tracking of the GNSS carrier wave in addition to the information content of the signal to enhance location accuracy. RTK generally requires two receivers: a "base" unit located at a fixed position and a "rover" unit, each of which has a GNSS receiver system that is capable of determining the phase of the carrier wave in addition to the information content of the signal. In surveying applications, for example, the base unit is placed in an open area with a clear view of the sky and remains stationary, allowing a location fix to be determined and maintained. The rover unit is moved about the survey site to determine locations of various points of interest. The base unit transmits its observed carrier phase information to the rover unit, and the rover unit can use this additional input in generating its own location estimates. RTK can achieve location accuracy on the order of 1 cm under favorable conditions. Precise point positioning (PPP) is another technique that uses carrier phase in addition to the information content of the signal in determining a location. Unlike RTK, PPP does not require a base unit, but centimeter-level accuracy may require that the receiver remain stationary for a sufficient period of time, which can be on the order of minutes.

Techniques such as RTK and PPP can substantially improve accuracy of GNSS location measurements. However, multipath errors in particular remain a limiting factor for the precision of GNSS location measurements.

SUMMARY

Embodiments described herein relate to location-determining devices and other GNSS receiver systems that include two GNSS receiver antennas positioned in fixed relation to each other and separated by a short baseline (which can be any length short enough that atmospheric effects can be treated as being the same for both antennas, for example, lengths up to a few meters). Signals received from the two receiver antennas can be processed using techniques described herein to estimate a degree to a multipath effect may be impairing reliability of observables extracted from the received signals. In some embodiments where both antennas observe signals at the same carrier frequency from the same GNSS satellite, each antenna can determine a carrier phase, and a single-difference carrier phase (SDCP) can be computed, e.g., by subtracting the carrier phase observables from the two antennas. Due to the short baseline, the SDCP is dominated by multipath effects and geometric offset between the antennas. Correcting for the geometric offset (e.g., based on available information about antenna and satellite positions) can provide an estimate of the degree to which the observations are affected by multipath. In some embodiments where both antennas observe signals at two (or more) carrier frequencies from the same GNSS satellite, a "geometry-free" SDCP can be computed, e.g., by subtracting SDCPs determined for different frequencies. The geometry-free SDCP can provide an estimate of the degree to which the observations are affected by multipath. The degree of multipath effect estimated from a given SDCP (including a geometry-free SDCP) can be used to assign a weight to the corresponding observations, with observations having a higher degree of multipath effect being assigned lower weight (or discarded entirely). The weights assigned to different observations can be used when determining location of one (or both) of the antennas using signals from multiple GNSS satellites, thereby providing mitigation of multipath errors.

Some embodiments relate to methods of determining location of a receiver system having a first antenna and a second antenna mounted on a movable structure in fixed locations relative to each other and defining a baseline. For example, the first antenna and the second antenna can receive global navigation satellite system (GNSS) signals from a plurality of GNSS satellites. For each received GNSS signal, the receiver system can: extract a first set of observables from the GNSS signal as received by the first antenna, the first set of observables including a first carrier phase; extract a second set of observables from the GNSS signal as received by the second antenna, the second set of observables including a second carrier phase; and compute a single difference carrier phase (SDCP) between the first carrier phase and the second carrier phase. The receiver system can assign a weight for each GNSS satellite based at least in part on the SDCP computed for each received GNSS signal and can determine a location of the receiver system using the first and second sets of observables extracted from the received GNSS signals and the weights.

In some embodiments, assigning a weight for each GNSS satellite can include: determining an orientation of the first antenna and the second antenna (e.g., using an inertial measurement unit mounted to the receiver system in a fixed position relative to the first and second antennas); determining a geometric offset between the first antenna and the second antenna based at least in part on the orientation of the first antenna and the second antenna; subtracting the geometric offset from the first SDCP to produce a modified SDCP; and using the modified SDCP to estimate a multipath effect, where the weight is determined using the estimated multipath effect. For example, the weight decreases with increasing estimated multipath effect.

In some embodiments, assigning a weight for each GNSS satellite can include: performing a real-time kinematic (RTK) location determination using the first antenna and the second antenna; determining a residual for each GNSS satellite based on a result of the RTK location determination; and assigning a weight for each GNSS satellite based on the residuals.

In some embodiments, assigning a weight for each GNSS satellite can include estimating a multipath contribution to the SDCP and determining the weight based on the multipath contribution, for instance by applying a sigmoid function to the multipath contribution.

Some embodiments relate to methods of determining location of a receiver system having a first antenna and a second antenna mounted on a movable structure in fixed locations relative to each other and defining a baseline. For example, a receiver system can receive global navigation satellite system (GNSS) signals from a plurality of GNSS satellites at a first antenna and a second antenna of the receiver system, where the first antenna and the second antenna are mounted to the receiver system in a fixed relative position and define a baseline, and where the GNSS signals include a plurality of GNSS signals having different frequencies. The receiver system can extract a first set of observables from each GNSS signal received at the first antenna, the first set of observables including a first carrier phase of each received GNSS signal at each of the different frequencies, and can extract a second set of observables from each GNSS signal received at the second antenna, the second set of observables including a second carrier phase of each received GNSS signal at of the different frequencies. For each GNSS satellite and frequency, the receiver system can compute a frequency-specific single difference carrier phase (SDCP) between the first carrier phase and the second carrier phase. The receiver system can also compute, for each GNSS satellite, a geometry-free SDCP based on the frequency-specific SDCPs at two different frequencies. The receiver system can assign respective weights to the observations from each GNSS satellite based at least in part on the geometry-free SDCP and can determine a location of the receiver system using the first and second sets of observables of the received GNSS signals and the weights. For instance, the receiver system can perform a real-time kinematic (RTK) analysis using information extracted from the GNSS signals received at the first antenna and additional information received from a base unit.

In some embodiments, assigning the weight can include estimating a multipath contribution to the geometry-free SDCP and determining the weight based on the multipath contribution, wherein the weight decreases as the multipath contribution increases. For instance, assigning the weight can include applying a sigmoid function to the multipath contribution. In some embodiments, a weight of zero can be assigned if the multipath contribution exceeds a particular threshold.

Certain embodiments relate to systems for determining location. For example, the system can include a movable structure (such as a survey pole, a vehicle, or other rigid body that can be moved about to different locations); a first antenna and a second antenna mounted to the movable structure at a fixed baseline distance apart (e.g., less than a few meters, or less than a meter, down to a few centimeters) and configured to receive global navigation satellite system (GNSS) signals from each of a plurality of GNSS satellites; receiver circuitry coupled to the first antenna and the second antenna; and a signal processing engine coupled to the receiver circuitry. The receiver circuitry can be configured to extract a first set of observables from a first GNSS signal from a first one of the GNSS satellites as received by the first antenna and a second set of observables from the first GNSS signal as received by the second antenna, wherein the first set of observables includes a first carrier phase and the second set of observables includes a second carrier phase. The signal processing engine can be configured to: compute a first single difference carrier phase (SDCP) between the second carrier phase and the first carrier phase; assign a weight to the first and second sets of observables based at least in part on the first SDCP; and determine a location of the movable structure using the weight and the first and second sets of observables.

In some embodiments, the signal processing engine can be configured such that assigning the weight to the first and second sets of observables includes: estimating a multipath contribution to the first SDCP; and determining the weight based on the multipath contribution, wherein the weight decreases as the multipath contribution increases. In some embodiments, a weight of zero can be assigned if the multipath contribution exceeds a particular threshold.

In some embodiments, the system can also include an inertial measurement unit (IMU) coupled to the signal processing engine and configured to determine an orientation of the first antenna and the second antenna. The signal processing engine can be configured such that assigning the weight includes: determining a geometric offset between the first antenna and the second antenna based at least in part on the orientation of the first antenna and the second antenna; subtracting the geometric offset from the first SDCP to produce a modified SDCP; and using the modified SDCP to estimate a multipath effect, where the weight is determined using the estimated multipath effect.

In some embodiments, the receiver circuitry can be configured to extract a third set of observables from a second GNSS signal from the first one of the GNSS satellites as received by the first antenna and a fourth set of observables from the second GNSS signal as received by the second antenna, wherein the second GNSS signal has a frequency different from a frequency of the first GNSS signal, wherein the third set of observables includes a third carrier phase and the fourth set of observables includes a fourth carrier phase. The signal processing engine can be configured to: compute a second single difference carrier phase (SDCP) between the third carrier phase and the fourth carrier phase; compute a geometry-free SDCP from the first SDCP and the second SDCP; and assign a weight to the first, second, third, and fourth sets of observables based at least in part on the geometry-free SDCP; and determine the location of the movable structure using the weight and the first, second, third, and fourth sets of observables. For example, the signal processing engine can be configured such that assigning the weight to the first, second, third, and fourth sets of observables includes: estimating a multipath contribution to the geometry-free SDCP; and determining the weight based on the multipath contribution, wherein the weight decreases as the multipath contribution increases.

In some embodiments, the signal processing engine can be configured to determine a threshold using respective geometry-free SDCPs computed for a plurality of GNSS satellites and to assign a respective weight to observables from each of the GNSS satellites based on the threshold. The receiver circuitry can be configured such that determining the location of the movable structure is based in part on the respective weights.

The following detailed description, together with the accompanying drawings, will provide a better understanding of the nature and advantages of the claimed invention.

The patent or application file contains at least one drawing executed in color. Copies of this patent or patent application publication with color drawing(s) will be provided by the Office upon request and payment of the necessary fee.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 1 shows a simplified diagram of a location-determining system according to some embodiments.

FIG. 7 is a flow diagram of a process for determining a location of an antenna according to some embodiments.

FIG. 9 shows graphs of geometry-free SDCP obtained from various satellites using the process of FIG. 7 according to some embodiments.

DETAILED DESCRIPTION

Figures 2A, 2B:
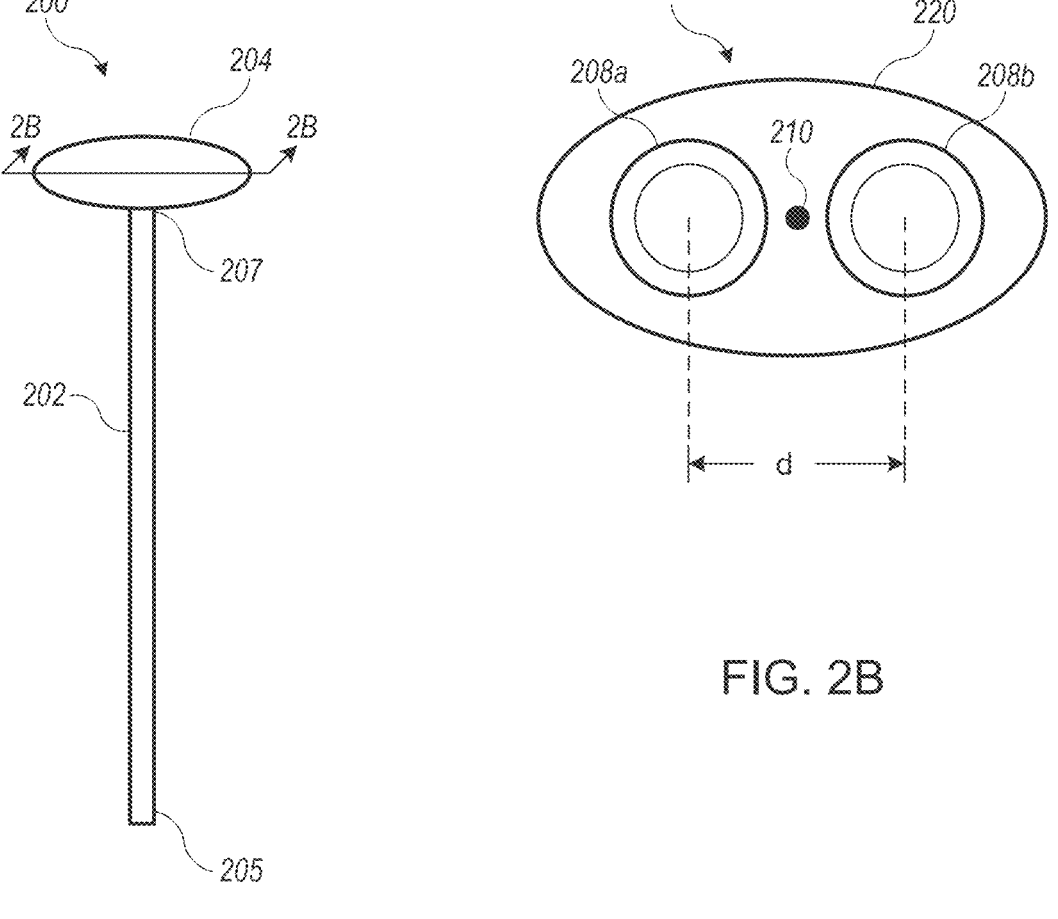
FIGS. 2A and 2B show views of a location-measuring device according to some embodiments, with FIG. 2A showing a simplified side view and FIG. 2B showing a simplified cross-section view.

The following description of exemplary embodiments of the invention is presented for the purpose of illustration and description. It is not intended to be exhaustive or to limit the claimed invention to the precise form described, and persons skilled in the art will appreciate that many modifications and variations are possible. The embodiments have been chosen and described in order to best explain the principles of the invention and its practical applications to thereby enable others skilled in the art to best make and use the invention in various embodiments and with various modifications as are suited to the particular use contemplated.

Embodiments described herein relate to location determination using global navigation satellite system (GNSS) signals. As used herein, GNSS refers generally to any constellation of satellites that broadcast signals receivable by an antenna. A GNSS receiver system, which generally includes an antenna and appropriately-configured receiver and signal processing circuitry, can determine a location of the antenna using signals received by the antenna from multiple satellites. Examples of GNSS include the Global Positioning System (GPS) (operated by the United States), GLONASS (operated by Russia), Galileo (operated by the European Space Agency), and/or BeiDou (operated by China). GNSS satellites may transmit signals at one or more frequencies (or wavelengths). For instance, all GPS satellites currently broadcast at frequencies referred to as "L1" (1575.42 MHz, wavelength about 0.19 m) and "L2" (1227.60 MHz, wavelength about 0.24 m); some also broadcast at "L5" (1176.45 MHZ, wavelength about 0.25 m). A given GNSS receiver system may be configured to detect and process signals from any or all of these or other GNSS satellites and may use conventional or other techniques to extract a location measurement from received satellite signals based on code phase and other data encoded in the signal (e.g., ephemeris data indicating satellite locations); other information such as carrier phase, Doppler shift, and the like may also be exploited. For example, where two GNSS receiver systems capable of determining carrier phase are available, real-time kinematics (RTK) can be used to produce a high-precision location estimate. Other techniques, such as precise point positioning (PPP), can also be used. A location determined using GNSS signals can be expressed in various formats, including coordinates indicating latitude, longitude, and/or altitude.

Embodiments described herein relate to location-determining devices and other GNSS receiver systems that include two antennas positioned in fixed relation to each other and separated by a short baseline. A "short" baseline can be of any length short enough that atmospheric effects can be treated as being the same for both antennas, for example, lengths up to a few meters. Shorter baselines, e.g., around 10 to 30 cm, may be more convenient for portable units. GNSS signals received from the two antennas can be processed using techniques described herein to estimate a degree to which multipath effects may be impairing reliability of observables extracted from the signals. In some embodiments where both antennas observe signals at the same carrier frequency from the same GNSS satellite, each antenna can determine a carrier phase, and a single-difference carrier phase (SDCP) can be computed, e.g., by subtracting the carrier phase observables from the two antennas. Due to the short baseline, the SDCP is dominated by multipath and geometric effects. Correcting for the geometric offset (e.g., based on available information about antenna and satellite positions) can provide an estimate of the degree to which the observations are affected by multipath. In some embodiments where both antennas receive signals at two or more carrier frequencies from the same GNSS satellite, a "geometry-free" SDCP can be computed, e.g., by subtracting SDCPs determined for different frequencies. The geometry-free SDCP can provide an estimate of the degree to which the observations are affected by multipath. The degree of multipath effect estimated from a given SDCP (including a geometry-free SDCP) can be used to assign a weight to the corresponding observations, with observations having a higher degree of multipath effect being assigned lower weight (or discarded entirely). The weights assigned to different observations can be used when determining location of one (or both) of the antennas using signals from multiple GNSS satellites, thereby providing mitigation of multipath errors.

FIG. 1 shows a simplified diagram of a location-determining system 100 according to some embodiments. System 100 includes a base unit 102 and a rover unit 104 that can be used to measure locations in an area 110. Each of base unit 102 and rover unit 104 can be equipped with one or more antennas to receive GNSS signals from satellites 140. In the example shown, base unit 102 has GNSS antennas 106a, 106b, and rover unit 104 has GNSS antennas 108a, 108b. Base unit 102 can be placed at a convenient location within area 110 and remain in that location for the duration of a survey operation (e.g., minutes, hours, days, depending on the application). The location of base unit 102 can be selected to avoid obstructions such as tree 116, providing a clear view of the sky. In particular, base unit 102 can have a direct communication path to receive signals from GNSS satellites 140 located in orbit. The particular number of GNSS satellites 140 with which base unit 102 communicates can be at least three, at least four, or a larger number. Those skilled in the art will appreciate that GNSS satellites 140 are generally not in geostationary orbits and may move relative to base unit 102; base unit 102 may receive signals from different combinations of GNSS satellites 140 at different times. Ideally, base unit 102 is located in a place where it is able to continually receive signals from a sufficient number of GNSS satellites 140 to establish and maintain a high-quality location fix for as long as the survey operation continues. Base unit 102 can remain at a fixed location while rover unit 104 is moved around to different locations within area 110 to obtain location measurements. In some embodiments, base unit 102 and rover unit 104 can support high-precision location determination techniques, including carrier phase detection. Real-time kinematics (RTK) can be used to determine the location of rover unit 104 with high precision, and base unit 102 can communicate with rover unit 104 to implement RTK. Other techniques, such as precise point positioning (PPP), can also be used, and a base unit is not required. In some implementations, base unit 102 may use PPP to determine its own location while rover unit 104 implements RTK using carrier phase data and/or other information provided by base unit 102. Accordingly, base unit 104 can include a radio-frequency (RF) communication antenna 114, and rover unit 104 can include a RF communication antenna 112. Antennas 114 and 112 can support wireless communication (e.g., in the UHF band) between base unit 102 and rover unit 104.

As rover unit 104 is moved around within area 110, the GNSS signal quality may be affected by obstructions such as tree 116. In particular, rover unit 104 may be susceptible to multipath effects, in which some (or all) of the GNSS signals bounce off an obstruction rather than taking a direct path from a satellite 140 to receiver antennas 108a, 108b of rover unit 104. Such effects can introduce error that reduces the accuracy of the location determined from the GNSS signals. As described below, antennas 108a, 108b in rover unit 104 (and/or antennas 106a, 106b in base unit 102) can be used to estimate the degree of multipath effects, and the estimate can be used in mitigation of such effects.

FIG. 2A shows a simplified side view of a location-measuring device 200 according to some embodiments. Location-measuring device 200 can be used to implement rover unit 104 or base unit 102 of system 100 of FIG. 1. In some embodiments, each of rover unit 104 and base unit 102 can be an instance of location-measuring device 200, with the difference being in operation rather than hardware components. Location measuring device 200 can include a pole 202 and an electronics module 204 mounted at a top end 207 of pole 202. Bottom end 205 of pole 202 can be placed on the ground to support device 200, and pole 202 can be long enough to elevate electronics module 204 to a desired height above ground level. If desired, the length of pole 202 can be adjustable. Although not shown in FIG. 2, pole 202 can include or be attached to tripod legs, spikes, cleats, or other structures to further stabilize pole 202 during location measurements.

FIG. 2B shows a simplified cross-section view of electronics module 204, through line 2B of FIG. 2A. Electronics module 204 can have a housing 220, within which are mounted two GNSS antennas 208a, 208b having the same configuration. Each of antennas 208a, 208b can be sized and shaped to receive GNSS signals at one or more frequencies. In some embodiments, antennas 208a, 208b can also be used to determine a carrier phase of the GNSS signal, e.g., using known techniques. Antennas 208a, 208b can be oriented in the same direction and separated by a baseline distance (d), which is fixed for a particular electronics module. Distance d can be any distance short enough that atmospheric effects can be treated as being the same for both antennas, for example, distances up to a few meters. In some embodiments, d can be 30 cm or less, which can provide a convenient form factor for devices intended to be hand-carried by a user. In some embodiments, distance d can be 10 cm. A midpoint 210 between antennas 208a, 208b can be aligned with the top end 207 of pole 202. In addition to antennas 208a, 208b, electronics module 204 can also include other components disposed within housing 220, such as receiver circuitry, signal processing engine(s), an inertial measurement unit, communication circuitry to communicate with a base unit (or rover unit), battery or other power source, and so on. The size and shape of housing 220 can be varied as desired, provided that there is sufficient space to house the relevant components.

Figure 3:
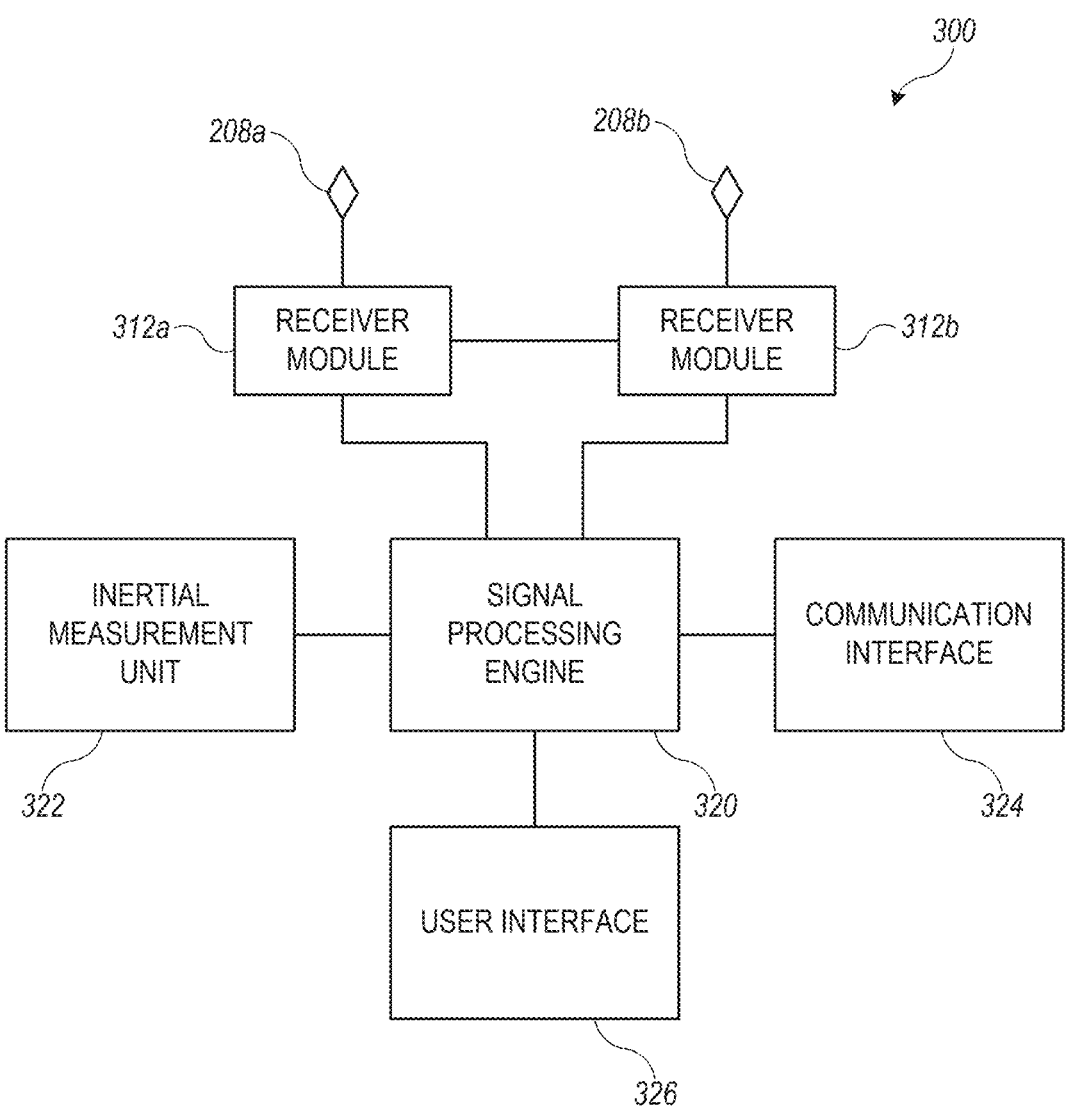
FIG. 3 shows a simplified block diagram of a GNSS receiver system according to some embodiments.

FIG. 3 shows a simplified block diagram of a GNSS receiver system 300, such as location-measuring device 200 according to some embodiments. In various embodiments, some or all components of GNSS receiver system 300 can be included in electronics module 204 of FIGS. 2A and 2B. As shown in FIG. 3, GNSS receiver system 300 can include antennas 208a, 208b; receiver modules 312a, 312b; a signal processing engine 320; an inertial measurement unit 322; a base unit interface component 324; and a user interface component 326.

Antennas 208a, 208b can be of the same size and configuration and tuned (or tunable) to GNSS signal frequencies. As described above, antennas 208a, 208b can be mounted in fixed relation to each other and oriented in the same direction, separated by a baseline distance d. Receiver modules 312a, 312b can be coupled to antennas 208a, 208b and can include electronic circuitry to amplify received GNSS signals, determine carrier phase, convert signals to baseband, and extract data from the signals. In some embodiments, some or all of the circuitry of receiver modules 312a, 312b can be shared between the two antennas. In particular, receiver modules 312*a*, 312*b* may share a common clock. If desired, both antennas 208*a*, 208*b* can be operated using a single receiver module. A particular implementation of antennas 208*a*, 208*b* and receiver modules 312*a*, 312*b* is not relevant to understanding the present disclosure; conventional or other implementations can be used.

Signal processing engine 320 can include logic circuitry (e.g., fixed-function ASIC and/or a programmable microprocessor or microcontroller) configured to perform signal processing operations on data provided by receiver modules 312*a*, 312*b*. For instance, signal processing engine 320 can be configured to determine a location (e.g., latitude, longitude, and altitude) based on the data provided by receiver modules 312*a*, 312*b*. Examples of techniques that can be implemented in signal processing engine 320 are described below.

Communication interface 324 can include RF communication circuitry, antennas and the like, which can be of conventional or other design. In some embodiments, communication interface 324 can be operated to provide data from a base unit (e.g., base unit 102 of FIG. 1) to a rover unit (e.g., rover unit 104) of FIG. 1. For instance, in embodiments where signal processing engine 320 of rover unit 104 implements RTK, communication interface 324 can be used to obtain carrier phase data and any other relevant data from base unit 102.

Inertial measurement unit (IMU) 322 can include a combination of sensors such as accelerometers, gyroscopes, compass, or the like, which can be of conventional or other design. In some embodiments, IMU 322 can be used to determine and provide a spatial orientation (e.g., pitch, roll, yaw) of electronics module 204. The spatial orientation provided by IMU 322 can be used in determining the location of a virtual antenna (e.g., as described below) and/or the base of pole 202.

User interface 326 can include components such as buttons, dials, keypad, display, touch screen, speakers, microphones, or the like to enable a user to interact with GNSS receiver system 300. For instance, a user may be able to initiate a location measurement using a button and/or read a location measurement using a display. These and/or other interactions can be supported. In some embodiments, GNSS receiver system 300 may be remotely operable and can include a communication interface to exchange signals with a remote control device. Wired or wireless communication protocols can be used, and a particular scheme for control input and data output is not relevant to understanding the present disclosure.

It will be appreciated that location-measuring device 200 and GNSS receiver system 300 are illustrative and that variations or modifications are possible. Receiver systems can have any desired form factor, provided that the two antennas can be accommodated. For example, the antennas may be mounted in fixed relation to each other on a vehicle or other movable structure or object and can be but need not be disposed inside a common housing. In addition, some or all components of GNSS receiver system 300 can be located remotely from other components. For instance, the signal processing engine may be housed in a separate device that communicates via wired or wireless channels with a device that includes the antennas, receiver modules, and IMU.

According to some embodiments, signal processing engine 320 can be configured (e.g., by programming and/or by design of suitable logic circuits) to perform a single-difference carrier phase (SDCP) computation using signals received by antennas 208*a*, 208*b*. Where multiple GNSS carrier frequencies are receivable by antennas 208*a*, 208*b*, a geometry-free SDCP computation can be performed. Results of the SDCP computation or geometry-free SDCP computation can be used to estimate a degree of multipath effect and assign weights to observations from different GNSS satellites. The weighted observations can be used for determining the location of antenna 208*a* and/or antenna 208*b*. Examples of location determining processes incorporating short-baseline SDCP computations will now be described.

Figure 4:
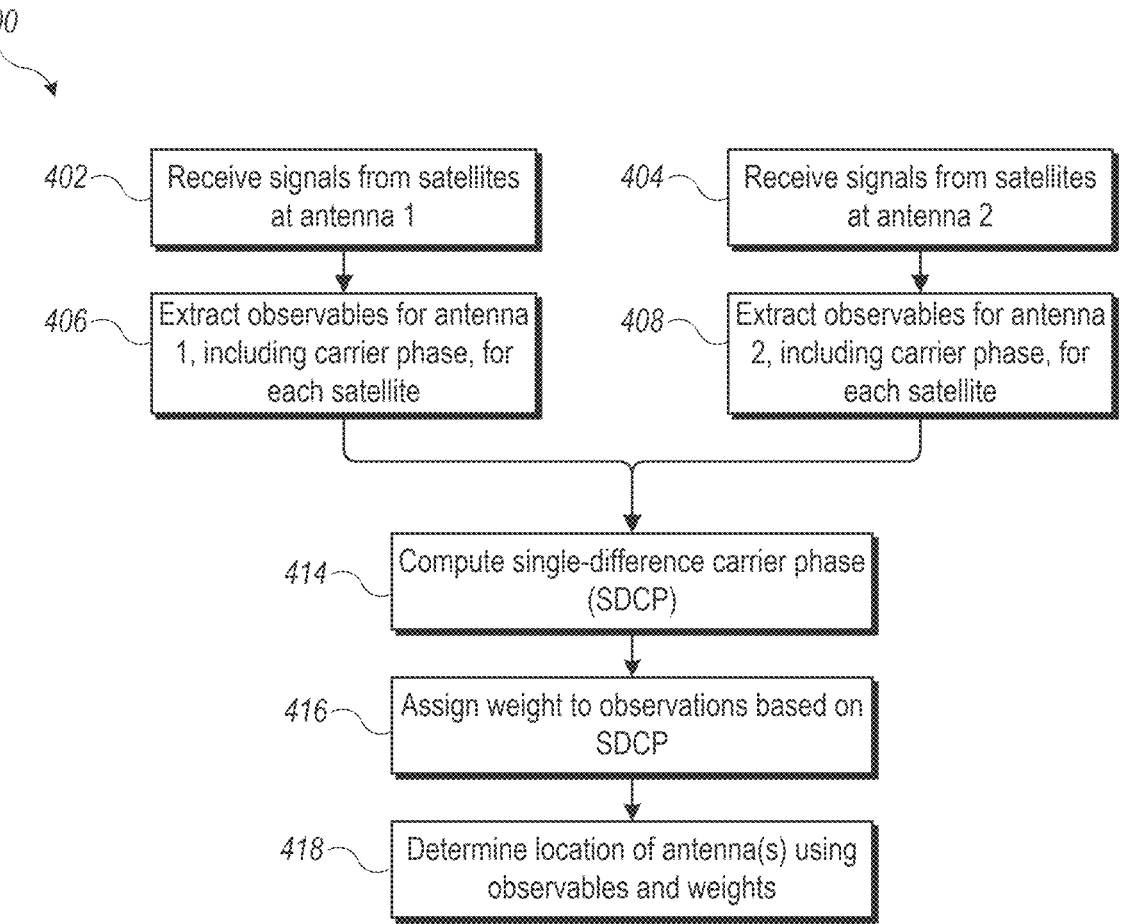
FIG. 4 shows a flow diagram of a process for determining a location of an antenna according to some embodiments.

FIG. 4 shows a flow diagram of a process 400 for determining a location of an antenna according to some embodiments. Process 400 can be implemented in GNSS receiver system 300 or other device or system having two antennas ("antenna 1" and "antenna 2") mounted in fixed relation to each other with a short baseline. Process 400 assumes that a location of GNSS receiver system 300 has already been estimated (e.g., using conventional GNSS techniques); however, the estimate may include error or uncertainty on the order of several meters. Process 400 can be used to reduce such error or uncertainty, e.g., to 10 cm or less in some embodiments.

At blocks 402 and 404, antenna 1 (e.g., antenna 208*a*) and antenna 2 (e.g., antenna 208*b*) can each receive signals from GNSS satellites, including any or all GNSS satellites that are in view of the antennas at a given time. At blocks 406 and 408, observables for each antenna can be extracted from the received signals. (As used herein, an "observation" refers to a set of observables for a particular antenna from a particular GNSS satellite at a particular frequency.) The observables can include any data or information that can be extracted from a GNSS signal and used in determining a distance to the GNSS satellite that was the source of the signal. Examples include a code observable, a Doppler observable, and a carrier phase observable (denoted herein as $$\Phi_f^A,$$

where A identifies an antenna and f identifies a frequency), all of which can be obtained using a suitably configured antenna and receiver. Observables can be extracted independently for each antenna, satellite, and frequency.

At block 414, a single difference carrier phase (SDCP), represented as $$\Delta\Phi_f^{1,2}$$

can be computed using signals from the same satellite having the same frequency received by the two antennas. More specifically, SDCP can be defined as $$\Delta\Phi_f^{1,2} = \Phi_f^1 - \Phi_f^2.$$

It should be understood that SDCP can be computed for any pair of observations (i.e., any instance where both antennas concurrently receive signals from the same satellite at the same frequency).

According to some embodiments, SDCP can be used to estimate a degree to which different observations may be affected by multipath. For instance, for a single GNSS satellite transmitting at a frequency f, the carrier phase observable for an antenna A can be expressed as:

$$\Phi_f^A = \rho + \delta\rho + cdt + cdT + \lambda N - I_f + T + m_f^A + \epsilon, \qquad (1)$$

where $\rho$ is the geometric range from the satellite to the receiver and the other terms represent various sources of error: $\delta\rho$ represents orbital error (due to satellite not being exactly in the nominal location); cdt represents a receiver clock bias; cdT represents a satellite clock bias; $\Delta$ is the wavelength of the GNSS carrier; N represents an ambiguity in the number of wavelengths between the satellite and the antenna; $1_f$ represents ionosphere-induced error for frequency f; T represents troposphere-induced error;

$$m_f^A$$

represents multipath error for antenna A at frequency f; and $\epsilon$ represents random noise. Computing SDCP has the effect of cancelling out some of these sources of error. For instance, due to the short baseline between antennas 1 and 2, ionospheric and tropospheric errors ($1_f$ and T in Eq. (1)) can be assumed to be the same for both antennas. Since both antennas are receiving from the same satellite, the satellite clock bias (cdT in Eq. (1)) is the same for both antennas. Assuming the receivers for both antennas operate from a common clock, the clock bias (cdt in Eq. (1)) is also the same for both antennas. Accordingly, in some embodiments $$\Delta\Phi_f^{1,2} = \Phi_f^1 - \Phi_f^2 = \Delta\rho + \lambda\Delta N + \Delta m_f^{1,2} + \epsilon, \qquad (2)$$

where $\Delta\rho$ is the difference in geometric range between the two antennas (also referred to herein as a "geometric offset"); $\lambda\Delta N$ represents the difference in ambiguity;

$$\Delta m_f^{1,2}$$

is the difference in the multipath error; and $\epsilon$ again represents random noise.

It should be noted that, even for a short baseline, the difference in multipath error cannot be assumed to be small. Since multipath effects are strongly location-dependent, two antennas separated by a short baseline distance can experience different multipath effects. It should also be understood that $$\Delta m_f^{1,2}$$

does not measure the multipath error for any given antenna or frequency; it is used here as an indicator of a degree to which multipath may be affecting the observables for a given observation (and/or any location computations that use those observables).

In some embodiments, block 414 can include computing SDCPs for multiple pairs of observations (up to and including every pair of observations). At block 416, weights can be assigned to the observations based on the SDCPs computed at block 414. In some embodiments, weights can be assigned such that observations associated with small $$\Delta m_f^{1,2}$$

are given higher weight than observations associated with large $$\Delta m_f^{1,2}.$$

As indicated in Eq. (2), the SDCP includes contributions from several error sources, and it is desirable to isolate the contribution of $$\Delta m_f^{1,2}$$

to the SDCP in order to assign weights. In some embodiments, isolating $$\Delta m_f^{1,2}$$

can be done by compensating for the geometric offset $\Delta\rho$, treating $\lambda\Delta N$ as a constant.

Figure 5:
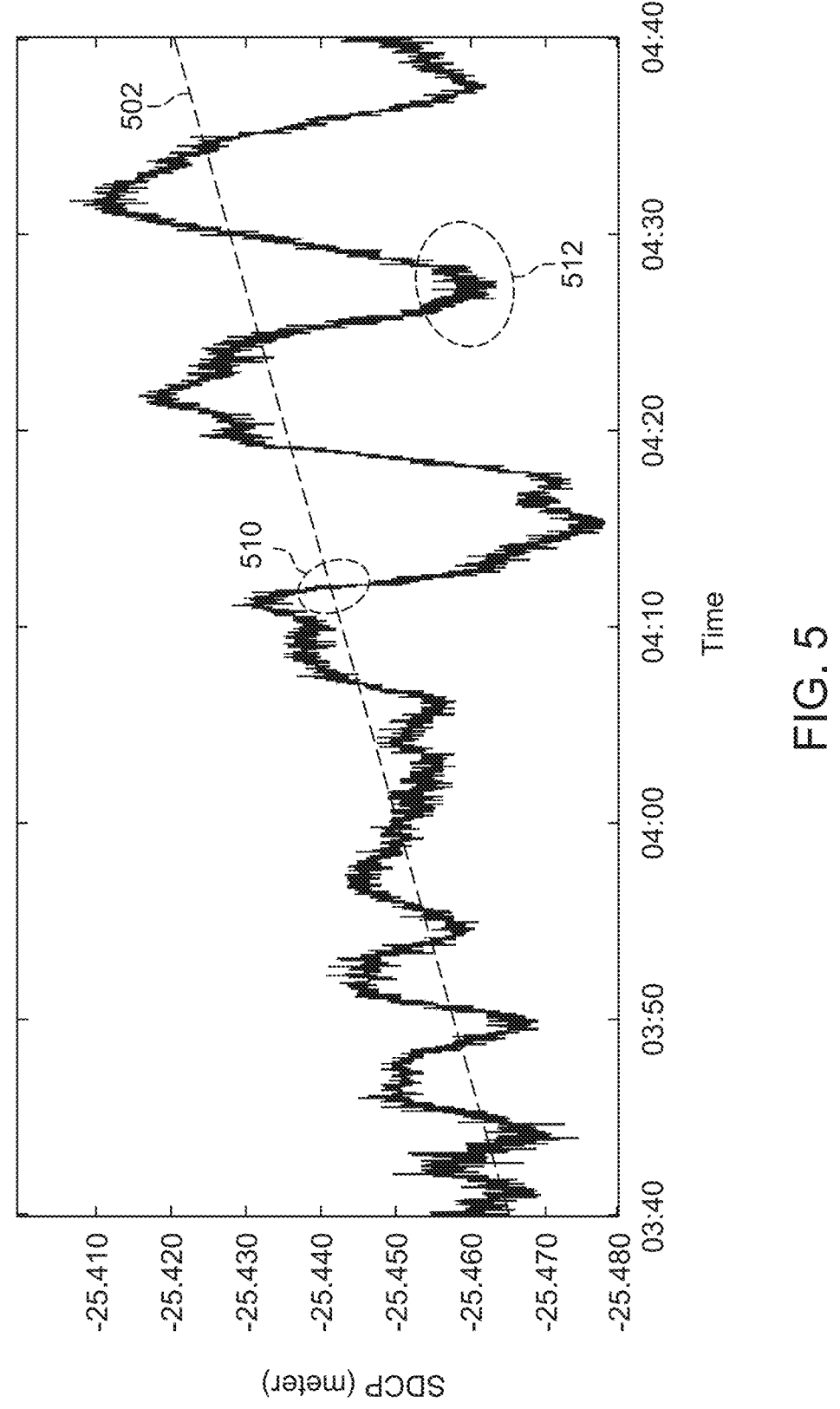
FIG. 5 shows a graph of a single-difference carrier phase (SDCP) computed according to some embodiments for a series of observations of the same satellite across a period of time.

By way of example, FIG. 5 shows a graph 500 of SDCP $$\Delta\Phi_f^{1,2}$$

for a series of observations of the same satellite across a period of time according to some embodiments; the observations were obtained using a dual-antenna device with a baseline of 10 cm that remained at a fixed location during the observations. The SDCP has an offset from zero that is attributable to the ambiguity difference $\lambda\Delta N$ and can be ignored. The SDCP also shifts systematically over time; this general trend is indicated by line 502. This systematic shift is a result of gradual changes in $\Delta\rho$ as the position of the satellite relative to the antennas changes with time. Based on estimated locations of the antennas and satellite, $\Delta\rho$ can be estimated and removed using a geometric transform. In some embodiments, orientation data from IMU 322 can be used to determine an orientation (in three-dimensional space) of the baseline between antenna 1 and antenna 2. For instance, the orientation data from IMU 322 can include roll, pitch and yaw angles defined relative to compass north (e.g., as determined by magnetic compass) and down (e.g., as determined by gravitational acceleration). Since the antennas are in fixed locations relative to the IMU, the roll, pitch, and yaw angles can be used to determine the spatial orientation of the baseline. Given the approximate positions of the antenna and satellite, $\Delta\rho$ can be estimated by triangulation and removed from $$\Delta\Phi_f^{1,2}.$$

(For a baseline distance d, $\Delta\rho$ is between $-d$ and $+d$.)

13

Accordingly, $$\Delta m_f^{1,2}$$

can be used to assign weights to observations. In some embodiments, observations for which $$\Delta m_f^{1,2}$$

is large can be assigned low (or zero) weight while observations for which $$\Delta m_f^{1,2}$$

is small can be assigned high weight. For example, a sigmoid function can be used, with the weight decreasing from 1 to 0 once $$\Delta m_f^{1,2}$$

exceeds a selected threshold. As another example, a hard threshold can be applied and observations for which $$\Delta m_f^{1,2}$$

exceeds a selected threshold can be discarded (or assigned a weight of 0). In some embodiments, the same weight is assigned to both observations of a given pair, since $$\Delta m_f^{1,2}$$

does not indicate which antenna is the source of error.

Once $\Delta\rho$ is removed, remaining variation between data points is assumed to be dominated by multipath effect $$\Delta m_f^{1,2}.$$

As can be seen in FIG. 5, the multipath effect is highly variable. For instance, in region 510, $$\Delta m_f^{1,2}$$

is small, while in region 512, $$\Delta m_f^{1,2}$$

is significantly larger. This is due to movement of the satellite across the sky relative to the antenna; the signal paths from the same satellite at different times may encounter different obstacles (or no obstacles). In some embodiments,

14

$$\Delta m_f^{1,2}$$

does not indicate which antenna is the source of error; instead, $$\Delta m_f^{1,2}$$

indicates the degree to which multipath is affecting reliability of the observables: higher $$\Delta m_f^{1,2}$$

indicates less reliable observables and vice versa.

As a more specific example, $\Delta\rho$ between antenna 1 and antenna 2 can be estimated by performing an RTK computation between antenna 1 and antenna 2, using one of the antennas as the "base" and the other as the "rover." As is known in the art, RTK uses the SDCP between the two antennas and uses a priori estimates of the variance or standard deviation of each antenna to assign weights to observations from different satellites. These a priori estimates can be a function of signal-to-noise ratio, satellite elevation angle, and a calibrated model of antenna behavior; conventional or other techniques can be used. In some embodiments, weights can be assigned based on a geometry-free analysis (e.g., as described below with reference to FIGS. 7-11), rather than relying on a priori estimates. Regardless of how weights are assigned, the RTK computation between antenna 1 and antenna 2 provides, among other outputs, an estimated "inter-vector" distance (e.g., $\Delta x$, $\Delta y$, and $\Delta z$) between antenna 1 and antenna 2. In this case, the actual baseline d between antenna 1 and antenna 2 is known (and fixed), and data from the IMU can be used to determine expected $\Delta x$, $\Delta y$, and $\Delta z$. A residual for each satellite can be defined as the difference between the estimated inter-vector distance and the actual baseline. The residual provides an indication of the relative reliability of different satellites (larger residual implies lower reliability), which can be used to define weights for each satellite.

At block 418, a location of one or both of the antennas can be determined using the observables and weights for observations of multiple GNSS satellites (at one frequency or multiple frequencies). The same observations used to compute SDCP and assign weights can also be used for location determination. In various embodiments, determining the location of an antenna can include observing multiple GNSS satellites and extracting observables for each satellite, determining a distance to each satellite using the set of observables, and computing a location of the antenna using triangulation of the distances and/or other techniques. All of the observations can be used, with different observations being given different weights. The weight for each observation can be the weight assigned at block 416. (In some embodiments, the weight assigned to an observation at block 416 can be subsequently modified based on other available indicia of absolute or relative reliability of that observation.) In some embodiments, RTK, PPP, or other high-precision GNSS location-determination techniques can be incorporated into the location determination for the antenna, using the weights assigned at block 416. A location can be determined for either antenna or for both antennas. Where RTK is used, the same base unit can provide reference data for both antennas.

In some embodiments, the location of a receiver containing the antennas can be determined by determining a location for each antenna and averaging the locations or by combining observables from both antennas and applying GNSS location-determining techniques to the combined observables. Examples of suitable processes are described in above-referenced U.S. Patent application Ser. No. 18/091,674.

As noted above, process 400 can use an estimation of the difference in geometric range between the two antennas ($\Delta\rho$) in order to isolate the contribution of multipath error $$(\Delta m_f^{1,2})$$

to the SDCP $$(\Delta\Phi_f^{1,2}).$$

Figure 6:
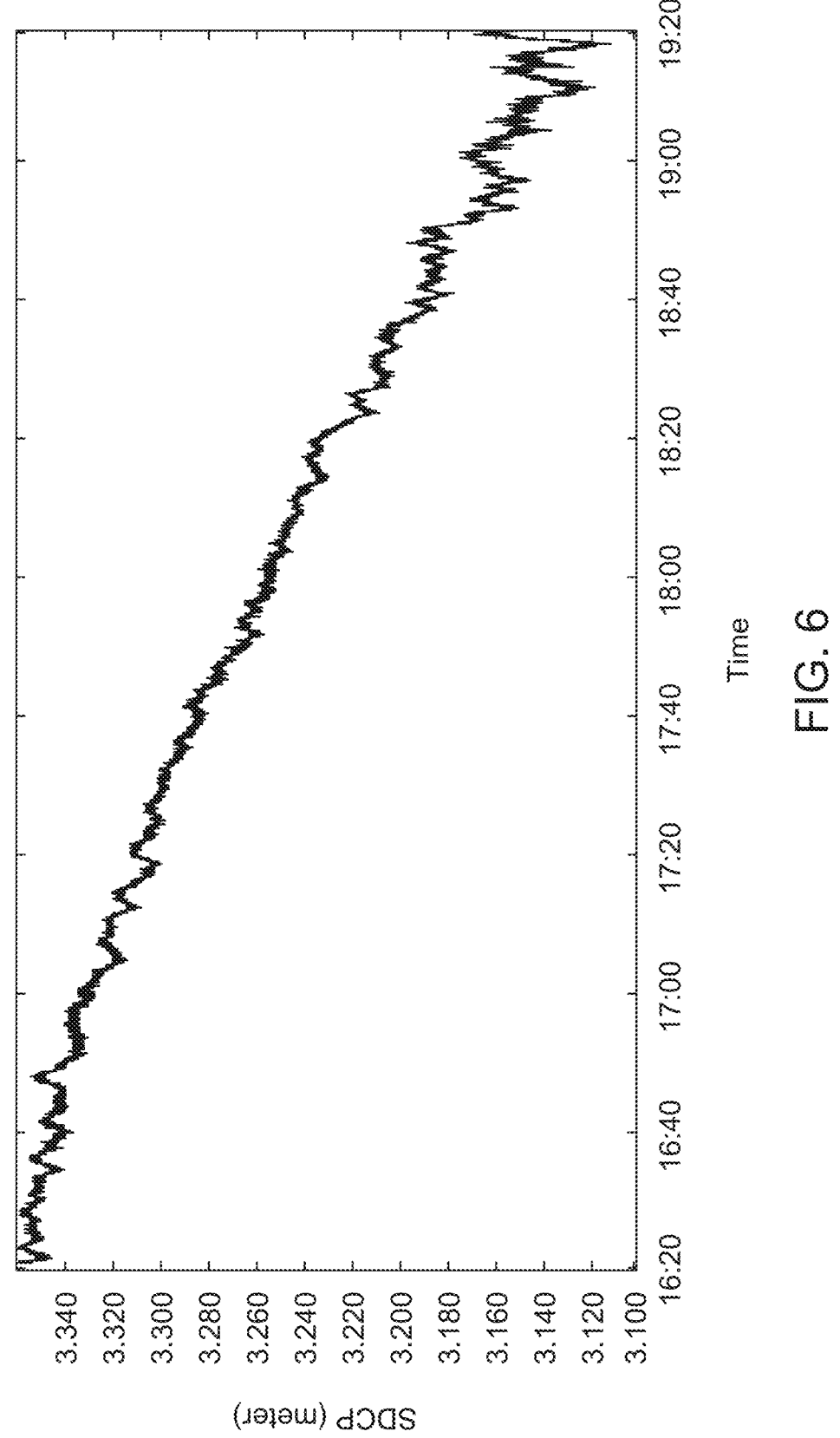
FIG. 6 shows another graph of SDCP computed according to some embodiments for a series of observations of the same satellite across a period of time.

Another approach can collect observations over a period of time while location-measuring device 200 remains in a fixed position and orientation, thereby producing a data set of the kind shown in FIG. 5. A fitting procedure can be applied to determine a trend line 502, allowing the contribution of multipath error to be isolated. However, in some cases, the effect of the changing geometric offset may predominate over the multipath effect. By way of example, FIG. 6 shows another graph 600 of SDCP $$\Delta\Phi_f^{1,2}$$

for a series of observations of the same satellite across a period of time according to some embodiments using a dual-antenna device with a baseline of 10 cm that remained at a fixed location during the observations. In this example the multipath effect creates only small excursions from the time-dependent variation of $\Delta\rho$. While process 400 can still be used, it may be desirable to use additional observations to remove or reduce the contribution of geometry offset to the SDCP.

FIG. 7 is a flow diagram of a process 700 for determining a location of an antenna according to some embodiments. Process 700 can be implemented in GNSS receiver system 300 or other device or system having two antennas ("antenna 1" and "antenna 2") mounted in fixed relation to each other with a short baseline. Process 700 can use observations at two or more different frequencies to remove the effect of antenna geometry; the result is referred to as "geometry-free SDCP." Process 700 assumes that each satellite broadcasts at two or more frequencies. The L1, L2, and L5 frequencies used by existing GPS satellites are used herein as an example, but any set of two or more available frequencies may be used.

At blocks 702 and 704, antenna 1 (e.g., antenna 208*a*) and antenna 2 (e.g., antenna 208*b*) can each receive signals from GNSS satellites, including any or all GNSS satellites that are in view of the antennas at a given time, at multiple frequencies. At blocks 706 and 708, observables for each antenna can be extracted from the received signals from each satellite and frequency. As in process 400, the observables can include any data or information that can be extracted from a GNSS signal and used in determining a distance to the GNSS satellite that was the source of the signal, including the code, Doppler, and carrier phase observables as mentioned above. Observables can be extracted independently for each antenna, satellite, and frequency. In some embodiments, blocks 702-708 for a given frequency can be identical to blocks 402-408 of process 400.

At block 714, for each frequency f, an SDCP $$\Delta\Phi_f^{1,2}$$

can be computed using signals from the same satellite having frequency f for the two antennas by subtracting $$\Phi_f^2 \text{ from } \Phi_f^1.$$

In some embodiments, block 714 for a given frequency can be identical to block 414 of process 400.

At block 716, a geometry-free SDCP, denoted as $$\Delta\Phi_{f1,f2}^{1,2}$$

can be computed by subtracting the SDCPs computed at block 714 for two different frequencies. Thus, for example, for the L1 and L2 GPS frequencies, $$\Delta\Phi_{L1,L2}^{1,2} = \Delta\Phi_{L1}^{1,2} - \Delta\Phi_{L2}^{1,2}.$$

From Eq. (2), it follows that $$\Delta\Phi_{L1,L2}^{1,2} = \Delta\Phi_{L1}^{1,2} - \Delta\Phi_{L2}^{1,2} = \tag{3}$$
$$\left(\Delta\rho_{L1}^{1,2} - \Delta\rho_{L2}^{1,2}\right) + \lambda\left(\Delta N_{L1}^{1,2} - \Delta N_{L2}^{1,2}\right) + \lambda\left(\Delta m_{L1}^{1,2} - \Delta m_{L2}^{1,2}\right) + \epsilon,$$

where $\epsilon$ represents random noise. Where the observations at both frequencies are made using the same pair of antennas and the same satellite (and the antennas are assumed to remain in a fixed position during the observations), $$\Delta\rho_{L1}^{1,2} = \Delta\rho_{L2}^{1,2},$$

and Eq. (3) reduces to:

$$\Delta\Phi_{L1,L2}^{1,2} = \lambda\Delta N_{L1,L2}^{1,2} + \Delta m_{L1,L2}^{1,2} + \epsilon'. \tag{4}$$

Similarly to Eq. (2), Eq. (4) obtains in the case of two antennas with a short baseline and a common receiver clock. The residual multipath term $$\Delta m_{L1,L2}^{1,2}$$

is not expected to be zero since it is not expected that multipath effects are the same across antennas or frequencies. In some embodiments, a geometry-free SDCP can be computed for multiple pairs of observations (up to and including every pair of observations).

Similarly to process 400, the residual multipath term can be used to identify observations (i.e., sets of observables) where multipath effect is likely to be significant. As with $$\Delta m_f^{1,2}$$

in process 400, residual multipath term $$\Delta m_{L1,L2}^{1,2}$$

does not indicate which antenna or frequency is the source of error; instead, $$\Delta m_{L1,L2}^{1,2}$$

indicates a degree to which multipath may be affecting the observables for a given observation (and/or any location computations that use those observables)

At block 718, weights can be assigned to the observations based on the geometry-free SDCPs computed at block 716. In some embodiments, observations for which $$\Delta m_{L1,L2}^{1,2}$$

is large can be assigned low (or zero) weight while observations for which $$\Delta m_{L1,L2}^{1,2}$$

is small can be assigned high weight. For example, a sigmoid function can be used, with the weight decreasing from 1 to 0 once $$\Delta m_{L1,L2}^{1,2}$$

exceeds a selected threshold. As another example, a hard threshold can be applied and observations for which $$\Delta m_{L1,L2}^{1,2}$$

exceeds a selected threshold can be discarded (or assigned a weight of 0). In some embodiments, the same weight is assigned to all observations that contributed to a given geometry-free SDCP, since $$\Delta m_{L1,L2}^{1,2}$$

does not indicate which antenna or frequency is the source of error. Additional examples of assigning weights are described below.

At block 720, a location of one or both of the antennas can be determined based on the observables and weights for observations of multiple GNSS satellites (at one frequency or multiple frequencies). The same observations used to compute geometry-free SDCP and assign weights can also be used for location determination. Similarly to block 418 of process 400, determining the location of an antenna can include observing multiple GNSS satellites and extracting observables for each satellite, determining a distance to each satellite using the set of observables, and computing a location of the antenna using triangulation of the distances and/or other techniques All of the observations can be used, with different observations being given different weights. The weight for each observation can be the weight assigned at block 718. (In some embodiments, the weight assigned to an observation at block 718 can be subsequently modified based on other available indicia of absolute or relative reliability of that observation.) In some embodiments, RTK, PPP, or other high-precision GNSS location-determination techniques can be incorporated into the location determination for each antenna. A location can be determined for either or both antennas. Where RTK is used, the same base unit can provide data for both antennas.

In some embodiments, the location of a receiver containing the antennas can be determined by determining a location for each antenna and averaging the locations or by combining observables from both antennas and applying GNSS location-determining techniques to the combined observables. Examples of suitable processes are described in above-referenced U.S. Patent application Ser. No. 18/091, 674.

In some embodiments, process 700 can be performed using more than two frequencies. For example, if a GPS satellite broadcasts at frequencies L1, L2, and L5, three geometry-free SDCPs can be computed using two antennas:

$$\Delta\Phi_{L1,L2}^{1,2} = \Delta\Phi_{L1}^{1,2} - \Delta\Phi_{L2}^{1,2}; \Delta\Phi_{L1,L5}^{1,2} = \Delta\Phi_{L1}^{1,2} - \Delta\Phi_{L5}^{1,2};$$

$$\text{and } \Delta\Phi_{L2,L5}^{1,2} = \Delta\Phi_{L2}^{1,2} - \Delta\Phi_{L5}^{1,2}.$$

Additional information about the effect of multipath can be inferred from these parameters. For instance, if $$\Delta m_{L1,L5}^{1,2}$$

is small while $$\Delta m_{L1,L2}^{1,2} \text{ and } \Delta m_{L2,L5}^{1,2}$$

is large, this may suggest that the L2 signal is experiencing multipath error. Assignment of weights at block 718 can incorporate this information, e.g., de-weighting the observations from a satellite at a particular frequency (L2 in this example) relative to other observations from the same satellite.

Figure 8:
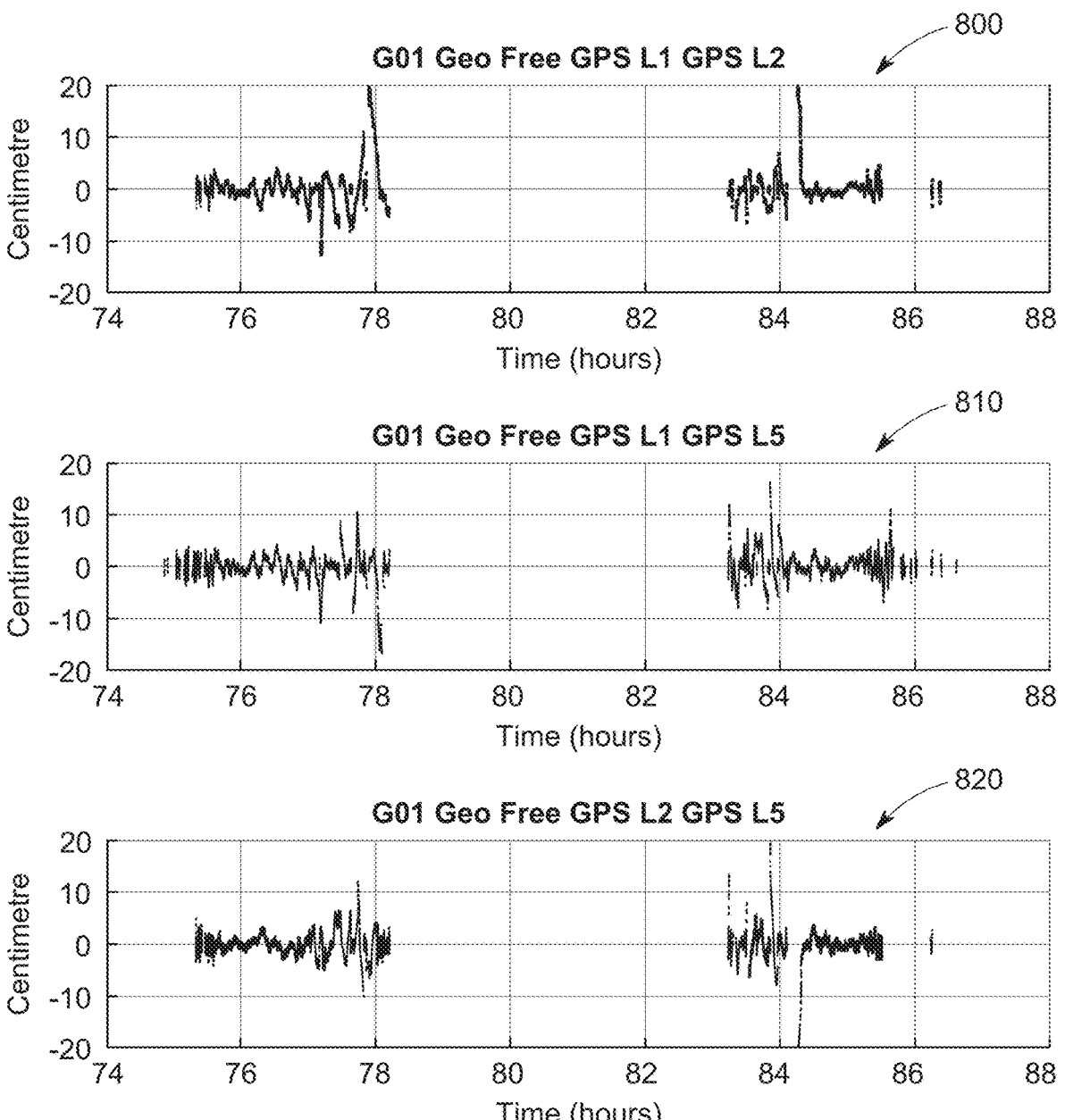
FIG. 8 shows graphs of geometry-free SDCPs obtained from observations of a GNSS satellite at multiple frequencies according to some embodiments.

FIG. 8 shows graphs 800, 810, 820 of geometry-free SDCPs obtained from observations of a GPS satellite at frequencies L1, L2, and L5, using a receiver unit similar to device 200 and an implementation of process 700. Graph 800 shows $$\Delta\Phi_{L1,L2}^{1,2};$$

graph 810 shows $$\Delta\Phi_{L1,L5}^{1,2};$$

and graph 820 shows $$\Delta\Phi_{L2,L5}^{1,2}$$

as functions of time. (There is a gap where the satellite was not visible to the antenna.) The oscillations reflect the time-varying magnitude of multipath effects.

According to various embodiments, weights can be assigned based on the relative reliability of signals from different satellites. FIG. 9 shows graphs 900, 910 of geometry-free SDCP obtained from various satellites (G10, G21, G25, G31, G32) using process 700 according to some embodiments. In graph 900, the geometry-free SDCP is plotted as a function of time. In graph 910, the absolute value of geometry-free SDCP for the same set of observations is plotted. In this example, satellites G10 and G31 are experiencing multipath, which appears as a sinusoidal effect that is larger than for other satellites.

Figure 10:
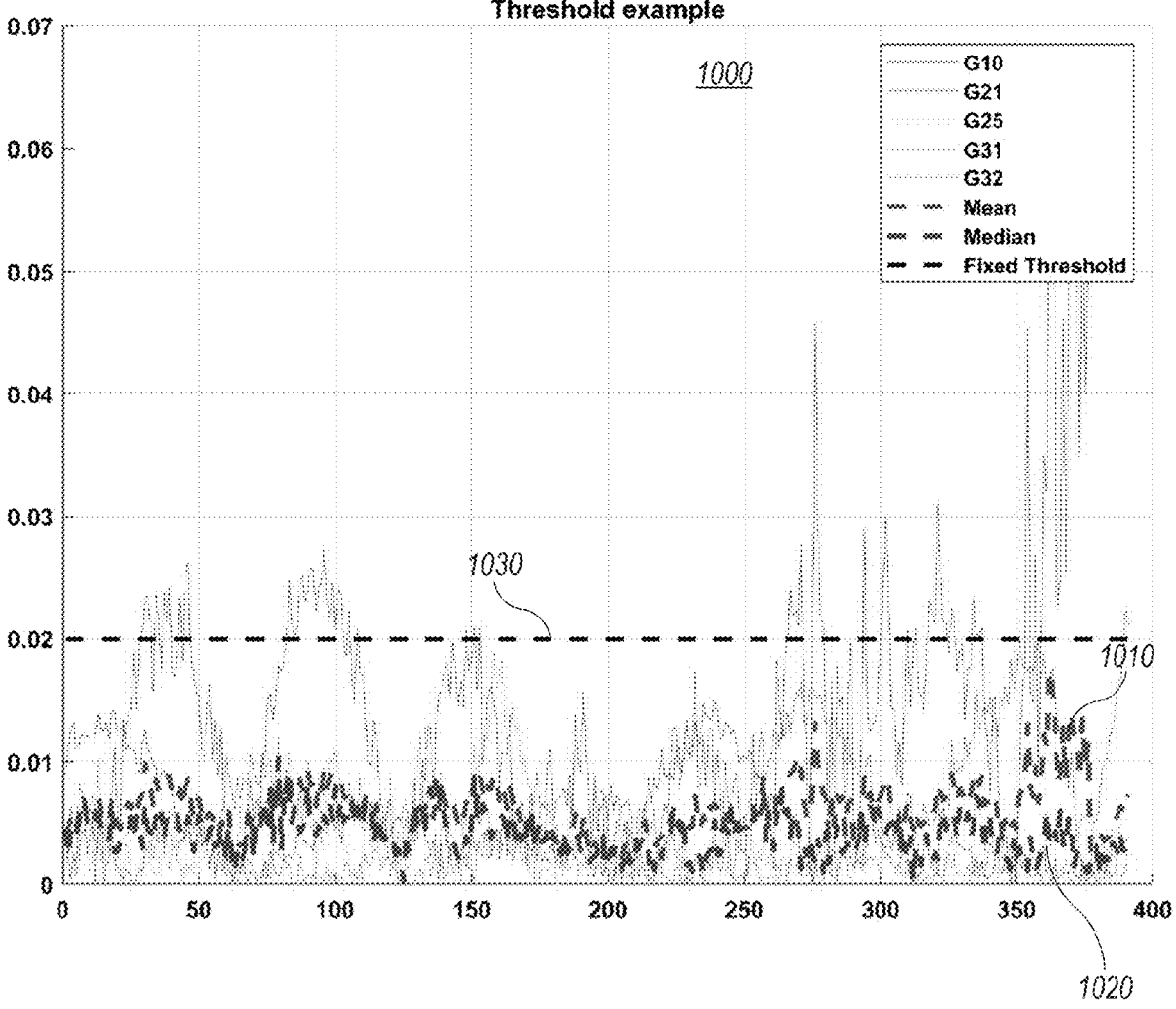
FIG. 10 shows a graph of thresholds that can be defined from the geometry-free SDCP observations of FIG. 9 according to some embodiments.

FIG. 10 shows a graph 1000 of thresholds that can be defined from the geometry-free SDCP observations of FIG. 9 according to some embodiments. A "mean threshold" 1010 is defined by computing the mean of geometry-free SDCP across all satellites, which changes with each set of observations. A "median threshold" 1020 is defined by computing the median of geometry-free SDCP across all satellites, which also changes with each set of observations. A "fixed threshold" 1030 can be chosen, e.g., based on analysis of large sets of observations. Any one of these thresholds, or a combination thereof, can be used. For instance, a predefined fixed threshold may be used if the median or mean of current observations exceeds the predefined fixed threshold, or the lowest of mean, median, and fixed threshold may be used in any given instance.

Figure 11:
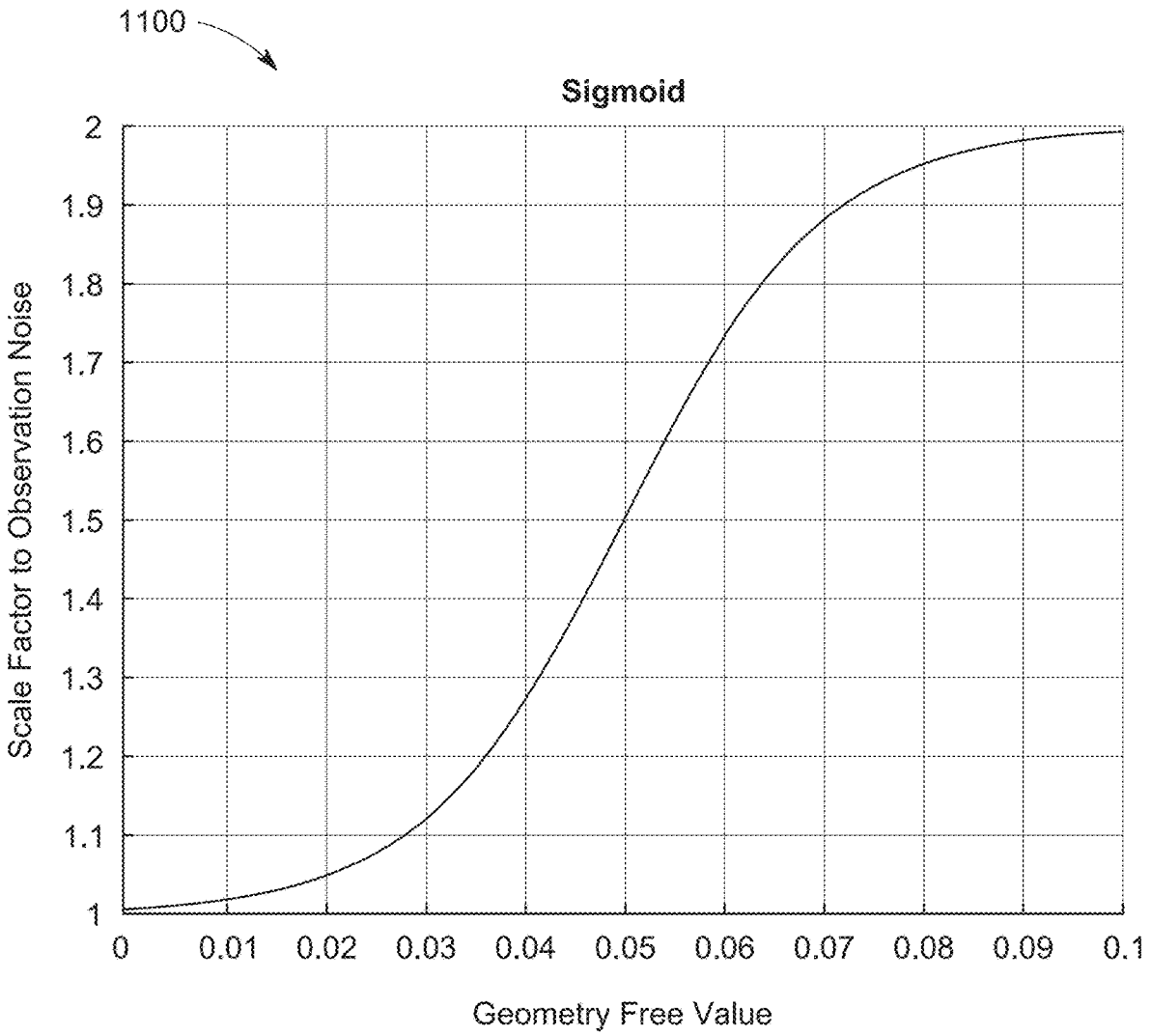
FIG. 11 shows a graph of a sigmoid function that can be used to assign weights to observations according to some embodiments.

In some embodiments, the weight for a given observation can be assigned based on the difference between the geometry-free SDCP and the threshold. Any observation for which the geometry-free SDCP is below threshold can be assigned a weight of 1. For observations with geometry-free SDCP above threshold, a de-weighting can be applied, such that the weight decreases with increasing geometry-free SDCP. As just one example, FIG. 11 shows a graph 1100 of a sigmoid function that can be used to assign weights according to some embodiments. The x-axis is the difference $$\Delta\Phi_{f1,f2}^{1,2} - Z,$$

where Z is a threshold that can be chosen based on mean, median or fixed values as described above. The y-axis is a noise parameter that, in this example, is inversely proportional to weight. Other weighting functions can be substituted for the sigmoid function of graph 1100.

Other techniques for assigning weights to observations based on geometry-free SDCP can also be used. For example, a moving window (rather than a single set of observations) can be used to define the mean or median geometry-free SDCP. Standard deviation or variance of the observations can be analyzed instead of just mean or median. In some embodiments, large data sets can be collected and analyzed to generate a lookup table of weight values (e.g., based on the difference between observed geometry-free SDCP and a threshold parameter that may be dynamically defined), and weights can be assigned using the lookup table.

Figure 12:
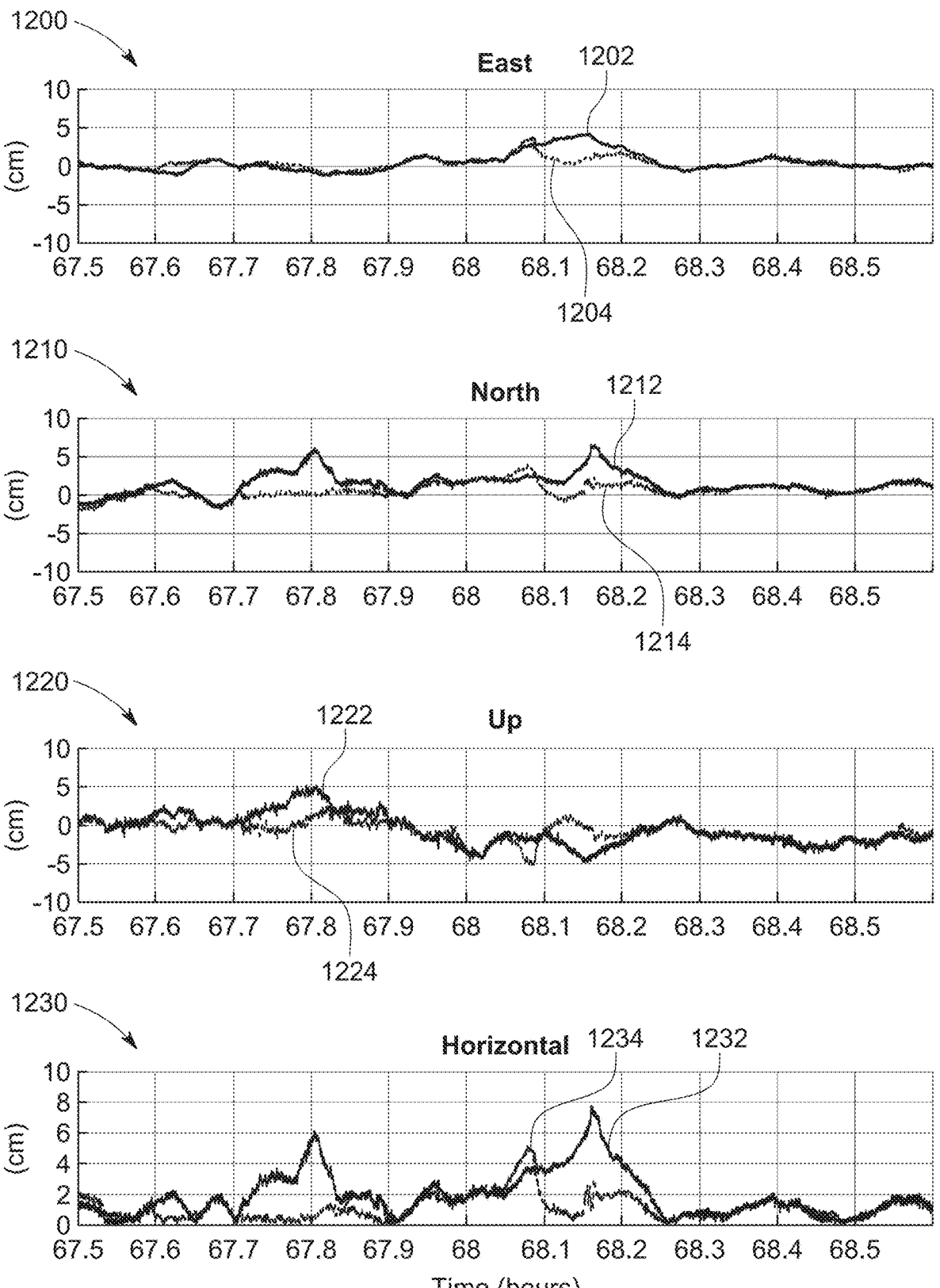
FIG. 12 shows graphs of errors in locations determined using a conventional process and a process according to some embodiments.

To illustrate the effectiveness of SDCP-based weighting techniques of the kind described herein, FIG. 12 shows graphs 1200, 1210, 1220, 1230 of GPS errors for location determination using: (1) a conventional RTK technique with a single rover antenna (lines 1202, 1212, 1222, 1232); and (2) a weighted RTK technique using an implementation of process 700 (lines 1204, 1214, 1224 1234) with GPS L1 and L2 frequencies. Location errors are plotted as a function of time for an east-west (longitude) direction (graph 1200); a north-south (latitude) direction (graph 1210); a vertical direction (graph 1220); and a net horizontal error (graph 1230). In this example, the use of observation weighting based on geometry-free SDCP can reduce horizontal RTK errors from greater than 8 cm to under 4 cm in some spots and can reduce vertical error by 2 to 4 cm. Accordingly, a process such as process 400 or process 700 can help improve reliability of GNSS location measurements.

While the invention has been described with reference to specific embodiments, those skilled in the art will appreciate that variations and modifications are possible. Any algorithms and techniques for determining location of an antenna (or receiver) using GNSS satellite data can be used, and any number or combination of GNSS observations can be incorporated into the location determination. In some embodiments, signals can be obtained at multiple frequencies (e.g., any or all of the L1, L2, and L5 frequencies used in GPS signals), and observables extracted from signals at different frequencies can be combined. The particular physical structures of the antennas can be implemented as desired, provided that the antennas are sized and shaped such that they can be mounted with a short baseline. Having the same physical configuration for both antennas can improve reliability of the measurements.

In some embodiments, a geometry-free SDCP analysis (e.g., as described above with reference to FIGS. 7-11) can be used to obtain initial weights for each satellite. These weights can be applied to an RTK process between the two antennas as described above with reference to FIG. 4 (instead of using a priori weights). Residuals from the RTK process can then be used to assign weights to observations for an RTK process with the base unit.

Location measurements determined using techniques described herein have a variety of applications. Depending on the particular application, location data can be output to a user, stored in a computer-readable storage medium, inserted as an annotation in a map or other survey record, and so on.

In some embodiments, dual-antenna systems can be implemented in tilted-pole survey systems. As described above, an inertial measurement unit in the survey pole can determine an orientation of the pole, and location measurements can be modified to account for tilt or rotation of the pole. Where RTK is used, dual-antenna systems can be included in the rover unit and/or the base unit, and techniques described herein can be applied. In the case of a base unit, which may remain in a fixed location for an extended period of time (minutes, hours, or days), PPP or similar techniques can be used to reduce the location error. A location of a rover unit can be determined using RTK with reference to the base unit. Signal processing circuitry can be disposed in the rover unit and/or the base unit as desired.

Dual-antenna systems can also be implemented in other applications where highly accurate location determination is desired. For example, a pair of GNSS receiver antennas can be mounted on a vehicle at a fixed baseline distance from each other (e.g., 20 cm up to 2-3 meters), and techniques described herein may be applied. The improved accuracy can be beneficial in applications such as autonomous vehicles.

While various circuits and components are described herein with reference to particular blocks, it is to be understood that these blocks are defined for convenience of description and are not intended to imply a particular physical arrangement of component parts. The blocks need not correspond to physically distinct components, and the same physical components can be used to implement aspects of multiple blocks. Components described as dedicated or fixed-function circuits can be configured to perform operations by providing a suitable arrangement of circuit components (e.g., logic gates, registers, switches, etc.); automated design tools can be used to generate appropriate arrangements of circuit components implementing operations described herein. Components described as processors or microprocessors can be configured to perform operations described herein by providing suitable program code. Various blocks might or might not be reconfigurable depending on how the initial configuration is obtained. Embodiments of the present invention can be realized in a variety of apparatus including electronic devices implemented using a combination of circuitry and software.

All processes described herein are also illustrative and can be modified. Operations can be performed in a different order from that described, to the extent that logic permits; operations described above may be omitted or combined; and operations not expressly described above may be added.

Computer programs incorporating features of the present invention that can be implemented using program code may be encoded and stored on various computer readable storage media; suitable media include magnetic disk or tape, optical storage media such as compact disk (CD) or DVD (digital versatile disk), flash memory, and other non-transitory media. (It is understood that "storage" of data is distinct from propagation of data using transitory media such as carrier waves.) Computer readable media encoded with the program code may include an internal storage medium of a compatible electronic device and/or external storage media readable by the electronic device that can execute the code. In some instances, program code can be supplied to the electronic device via Internet download or other transmission paths.

Accordingly, although the invention has been described with respect to specific embodiments, it will be appreciated that the invention is intended to cover all modifications and equivalents within the scope of the following claims.

What is claimed is:

1. A method comprising:
   receiving global navigation satellite system (GNSS) signals from at least four GNSS satellites at a first antenna of a receiver system and at a second antenna of the receiver system, wherein the first antenna and the second antenna are mounted to the receiver system in a fixed relative position and define a baseline, the baseline having a fixed length that is between 10 cm and 30 cm, and wherein the GNSS signals received from each of the at least four GNSS satellites include a plurality of GNSS signals having different frequencies and wherein the GNSS signals received from each of the GNSS satellites include signals at three or more different frequencies;

extracting, by the receiver system, a first set of observables from each GNSS signal received at the first antenna, the first set of observables including a first carrier phase of each received GNSS signal at each of the different frequencies;

extracting, by the receiver system, a second set of observables from each GNSS signal received at the second antenna, the second set of observables including a second carrier phase of each received GNSS signal at of the different frequencies;

computing, by the receiver system, for each GNSS satellite and each frequency, a frequency-specific single difference carrier phase (SDCP) between the first carrier phase and the second carrier phase;

computing, by the receiver system, for each GNSS satellite, a geometry-free SDCP based on the frequency-specific SDCPs at two different frequencies, wherein the computing includes determining at least three geometry-free SDCPs, wherein each of the at least three geometry-free SDCPs is based on a different pair of the frequencies;

determining, for each GNSS satellite, an estimate of a multipath effect based on the geometry-free SDCP for that GNSS satellite, wherein the determining includes determining a respective estimate of a multipath effect based on each of the geometry-free SDCPs;

comparing the respective estimates of the multipath effect to identify a frequency that is experiencing multipath error;

assigning, by the receiver system, respective weights to the observables from each GNSS satellite based at least in part on the estimated multipath effect for each GNSS satellite, wherein the weight is assigned according to a continuously-valued function that decreases with increasing estimated multipath effect and wherein a lower weight is assigned to observables extracted from GNSS signals at the frequency that is experiencing multipath error; and determining a location of the receiver system using the first and second sets of observables of the received GNSS signals and the weights.

2. The method of claim 1 wherein assigning the weight includes applying a sigmoid function to the estimated multipath effect.

3. The method of claim 1 wherein assigning the weight includes assigning zero weight if the estimated multipath effect exceeds a threshold.

4. The method of claim 1 wherein determining the location of the receiver system includes performing a real-time kinematic (RTK) analysis using information extracted from the GNSS signals received at the first antenna and additional information received from a base unit.

5. A system comprising:
   a movable structure;
   a first antenna and a second antenna mounted to the movable structure at a fixed baseline distance apart, the fixed baseline being between 10 cm and 30 cm, the first antenna and the second antenna being configured to receive global navigation satellite system (GNSS) signals from each at least four GNSS satellites, wherein the GNSS signals received from each of the at least four GNSS satellites include a plurality of GNSS signals having different frequencies and wherein the GNSS signals received from each of the GNSS satellites include signals at three or more different frequencies;

receiver circuitry coupled to the first antenna and the second antenna and configured to extract a first set of observables from a first GNSS signal from a first one of the GNSS satellites as received by the first antenna and a second set of observables from the first GNSS signal as received by the second antenna, wherein the first set of observables includes a first carrier phase at each of the different frequencies and the second set of observables includes a second carrier phase at each of the different frequencies; and a signal processing engine coupled to the receiver circuitry and configured to:

receive respective first and second sets of observables from the receiver circuitry for each of the at least four GNSS satellites;

compute, for each of the at least four GNSS satellites and each frequency, a first frequency-specific single difference carrier phase (SDCP) between the second carrier phase and the first carrier phase;

compute, for each GNSS satellite, a geometry-free SDCP based on the frequency-specific SDCPs at two different frequencies, wherein the computing includes determining at least three geometry-free SDCPs, wherein each of the at least three geometry-free SDCPs is based on a different pair of the frequencies;

determine, based on the geometry-free SDCPs, for each of the at least four GNSS satellites an estimate of a multipath effect for the GNSS satellite from which the GNSS signal was received, wherein the determining includes determining a respective estimate of a multipath effect based on each of the geometry-free SDCPs;

compare the respective estimates of the multipath effect to identify a frequency that is experiencing multipath error;

assign a weight for each of the GNSS satellites based at least in part on the first SDCP the estimate of the multipath effect for each GNSS satellite, wherein the weight is assigned according to a continuously-valued function that decreases with increasing estimated multipath effect and wherein a lower weight is assigned to observables extracted from GNSS signals at the frequency that is experiencing multipath error; and determine a location of the movable structure using the weight and the respective first and second sets of observables from the at least four GNSS satellites.

6. The system of claim 5 wherein the signal processing engine is further configured such that assigning the weight to the first and second sets of observables includes:

assigning zero weight if the estimated multipath effect exceeds a threshold.

7. The system of claim 5 further comprising:

an inertial measurement unit (IMU) coupled to the signal processing engine and configured to determine an orientation of the first antenna and the second antenna.

8. The system of claim 5 wherein the movable structure is a portable survey pole.

9. The system of claim 8 further comprising:

a base unit having a third antenna to receive GNSS signals from at least four GNSS satellites, wherein the base unit and the movable structure each include a radio-frequency (RF) communication antenna enabling RF communication between the base unit and the movable structure and wherein the base unit and the movable structure are configured to use real-time kinematics to determine the location of the movable structure.

* * * * *